US012557951B2

(12) United States Patent　　(10) Patent No.:　US 12,557,951 B2

Sand　　(45) Date of Patent:　Feb. 24, 2026

(54) FILTERING PAN APPARATUS

(71) Applicant: Paul Sand, Souris, ND (US)

(72) Inventor: Paul Sand, Souris, ND (US)

(*) Notice: Subject to any disclaimer, the term of this patent is extended or adjusted under 35 U.S.C. 154(b) by 480 days.

(21) Appl. No.: 18/095,806

(22) Filed: Jan. 11, 2023

(65) Prior Publication Data

US 2024/0225383 A1　　Jul. 11, 2024

(51) Int. Cl.
| | |
|---|---|
| *A47L 7/00* | (2006.01) |
| *A47L 9/12* | (2006.01) |
| *A47L 9/24* | (2006.01) |
| *A47L 9/32* | (2006.01) |
| *B01D 29/03* | (2006.01) |
| *B01D 29/96* | (2006.01) |
| *B01D 35/26* | (2006.01) |

(52) U.S. Cl.
CPC ........... *A47L 7/0009* (2013.01); *A47L 7/0014* (2013.01); *A47L 9/122* (2013.01); *A47L 9/248* (2013.01); *A47L 9/327* (2013.01); *B01D 29/03* (2013.01); *B01D 29/96* (2013.01); *B01D 35/26* (2013.01)

(58) Field of Classification Search
CPC .... A47L 9/0009; A47L 9/0014; A47L 7/0009; A47L 7/0004; A47L 7/0014
USPC ............................ 220/571, 573; 15/378, 422
See application file for complete search history.

(56) References Cited

U.S. PATENT DOCUMENTS

| | | | | |
|---|---|---|---|---|
| 4,953,255 | A * | 9/1990 | Jenkins | ................... A47L 9/102 |
| | | | | 15/327.2 |
| 5,979,516 | A * | 11/1999 | Grant | ................. F01M 11/0408 |
| | | | | 141/331 |
| 6,938,639 | B1 * | 9/2005 | Robinson | ................ A61M 1/84 |
| | | | | 220/571 |
| 8,011,342 | B2 | 9/2011 | Bluhm | |
| 8,435,009 | B2 | 5/2013 | Moore | |
| 9,157,434 | B2 | 10/2015 | Leonard | |
| 11,015,606 | B2 | 5/2021 | Bishop | |
| 2020/0182249 | A1 | 6/2020 | Mayleben | |
| 2022/0240737 | A1 * | 8/2022 | Conrad | ................... A47L 9/106 |

FOREIGN PATENT DOCUMENTS

| | | | | |
|---|---|---|---|---|
| KR | 960012807 | B1 * | 9/1996 | ............... A47L 9/02 |
| WO | WO2021113477 | | 6/2021 | |

* cited by examiner

*Primary Examiner* — Bryan R Muller

(57) ABSTRACT

A filtering pan apparatus for filtering solids out of fluid being removed by a vacuum system includes a base and a duct being coupled to and extending upwardly from the base. The duct has an inlet opening and an outlet opening extending into the duct, with the inlet opening being positioned adjacent to the base. A vacuum connector is coupled to and extends away from the duct and is in fluid communication with the outlet opening. The vacuum connector has a connector opening in a distal end thereof relative to the duct which extends into the vacuum connector. A filtering screen is coupled to and extends upwardly from the base. The filtering screen covers the inlet opening and is liquid permeable.

17 Claims, 6 Drawing Sheets

FILTERING PAN APPARATUS

BACKGROUND OF THE INVENTION

(1) Field of the Invention

The disclosure relates to filtering apparatuses and more particularly pertains to a new filtering apparatus for filtering solids out of fluid being removed by a vacuum system.

(2) Description of Related Art Including Information Disclosed Under 37 CFR 1.97 and 1.98

The prior art relates to filtering apparatuses which are components of sump pump systems.

BRIEF SUMMARY OF THE INVENTION

An embodiment of the disclosure meets the needs presented above by generally comprising a base and a duct being coupled to and extending upwardly from the base. The duct has an inlet opening and an outlet opening extending into the duct, with the inlet opening being positioned adjacent to the base. A vacuum connector is coupled to and extends away from the duct and is in fluid communication with the outlet opening. The vacuum connector has a connector opening in a distal end thereof relative to the duct which extends into the vacuum connector. A filtering screen is coupled to and extends upwardly from the base. The filtering screen covers the inlet opening and is liquid permeable.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
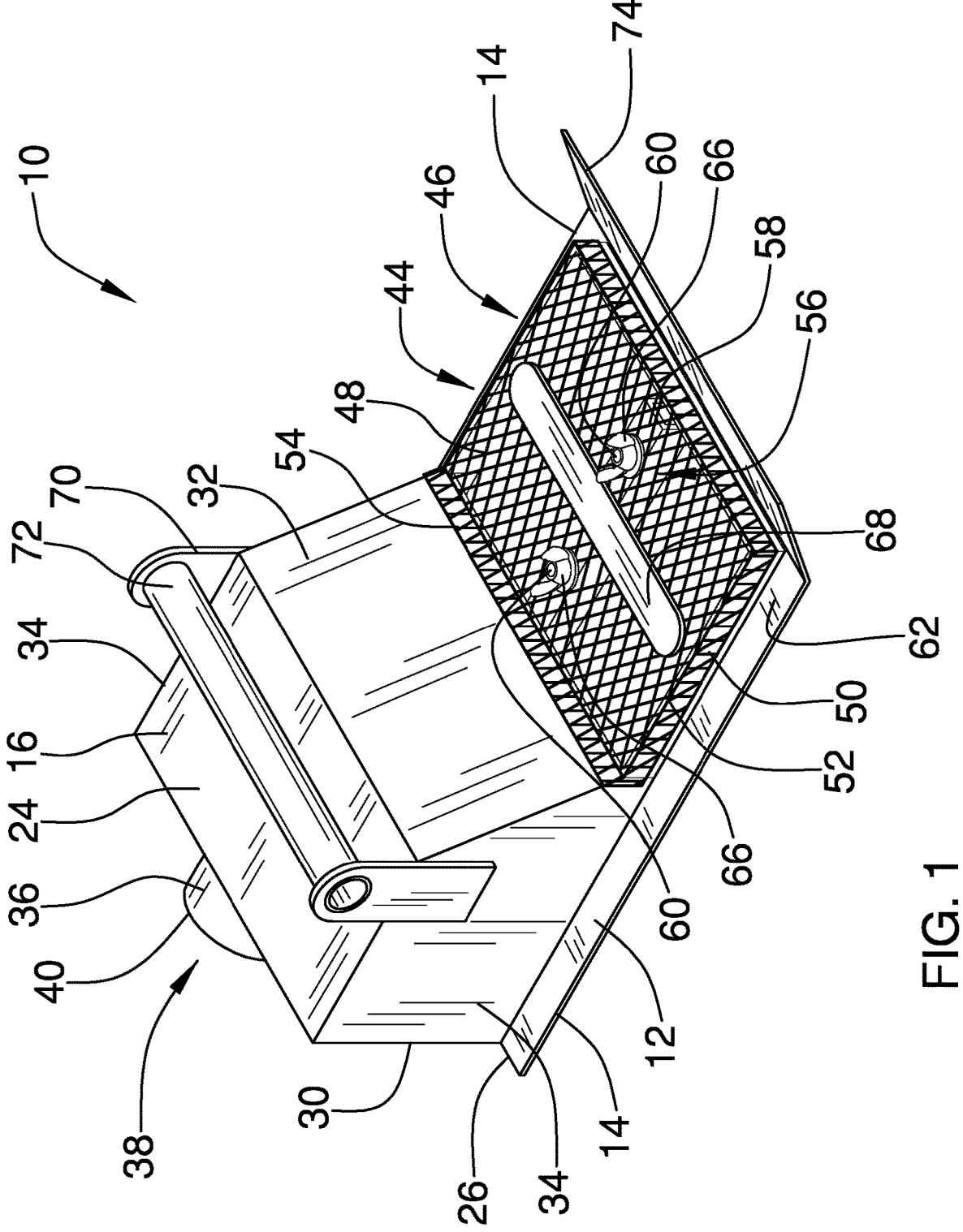
FIG. 1 is a top front side perspective view of a filtering pan apparatus according to an embodiment of the disclosure.
Figure 2:
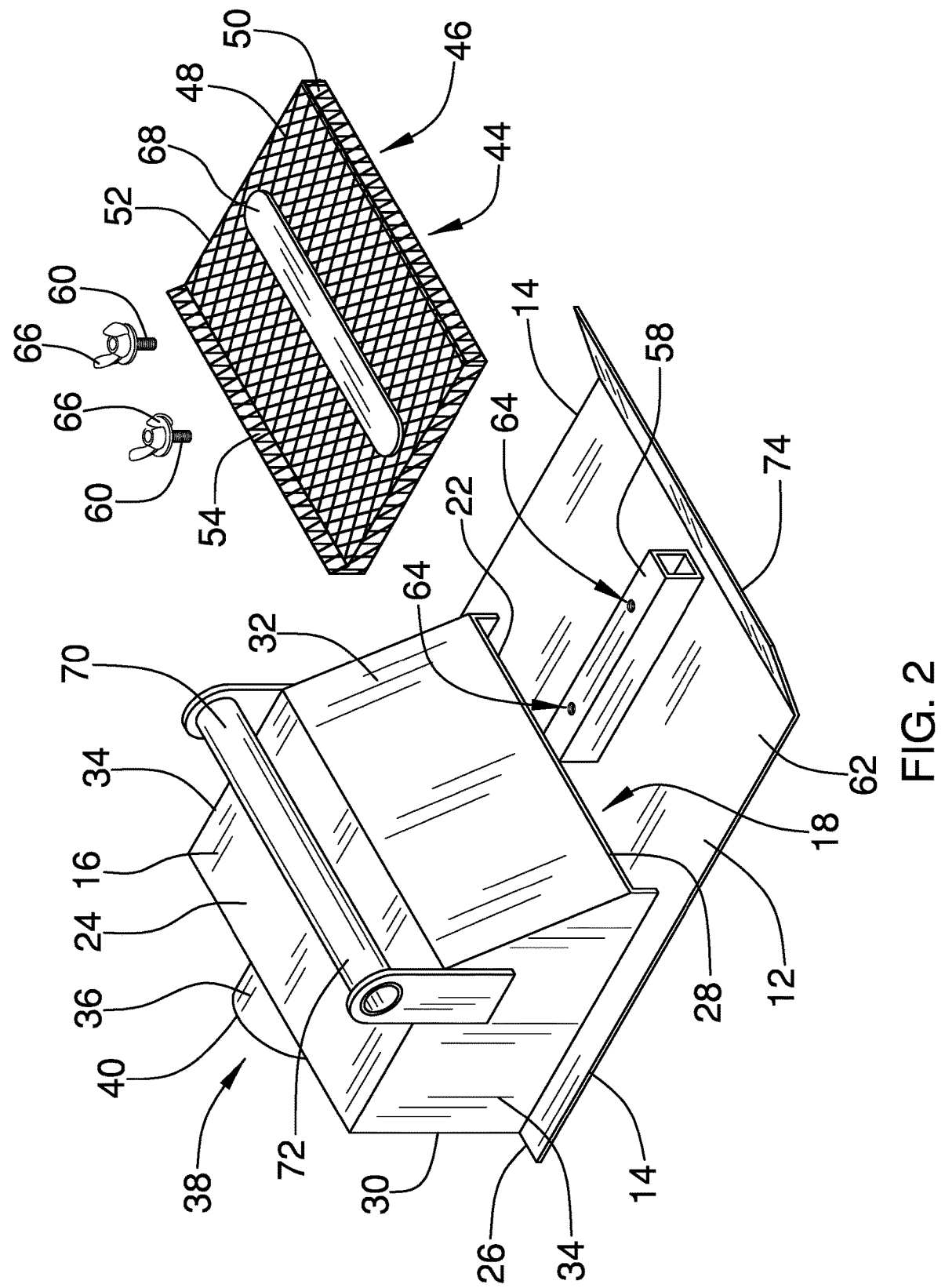
FIG. 2 is an exploded perspective view of an embodiment of the disclosure.
Figure 3:
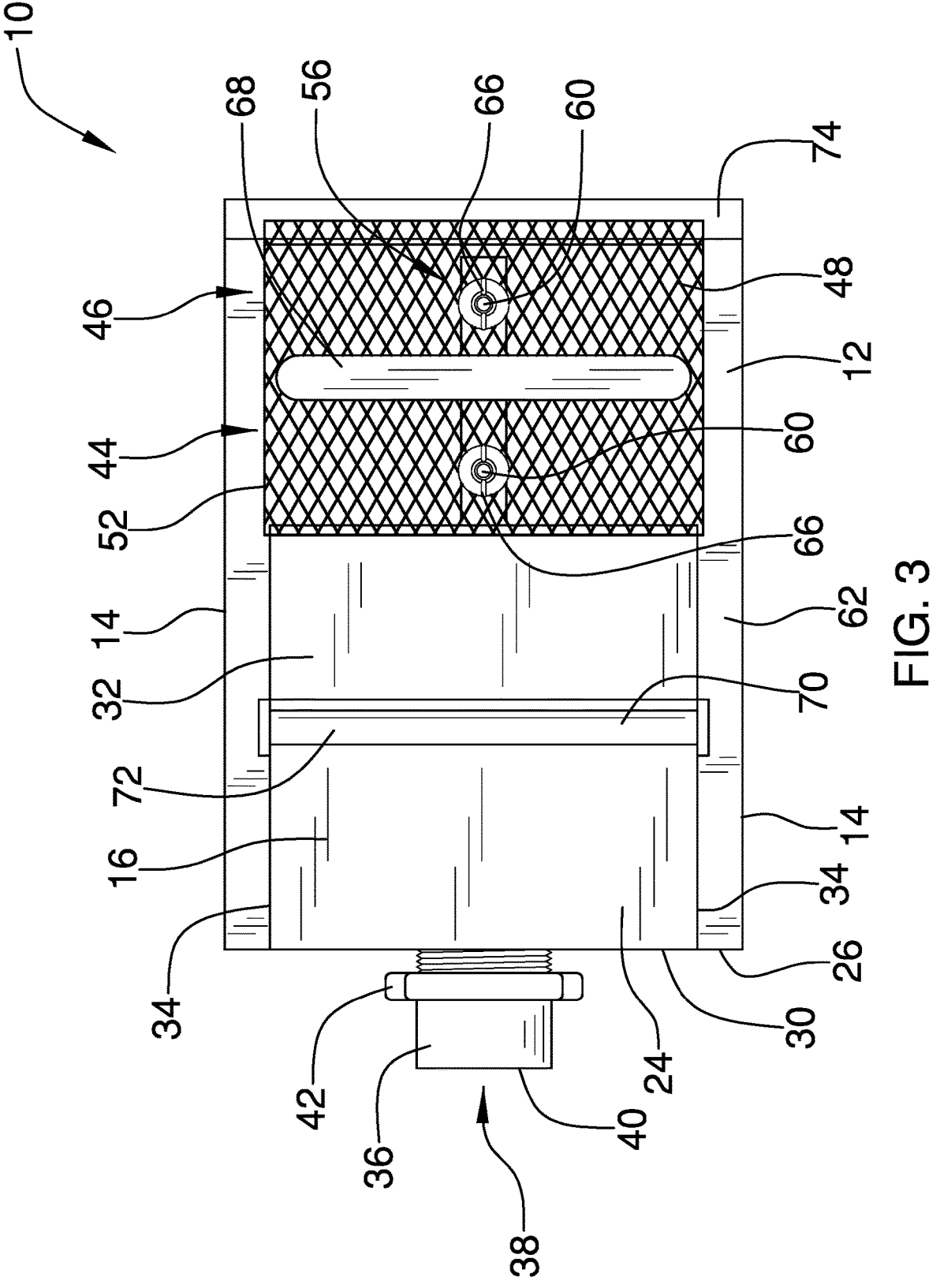
FIG. 3 is a top view of an embodiment of the disclosure.
Figures 4, 5:
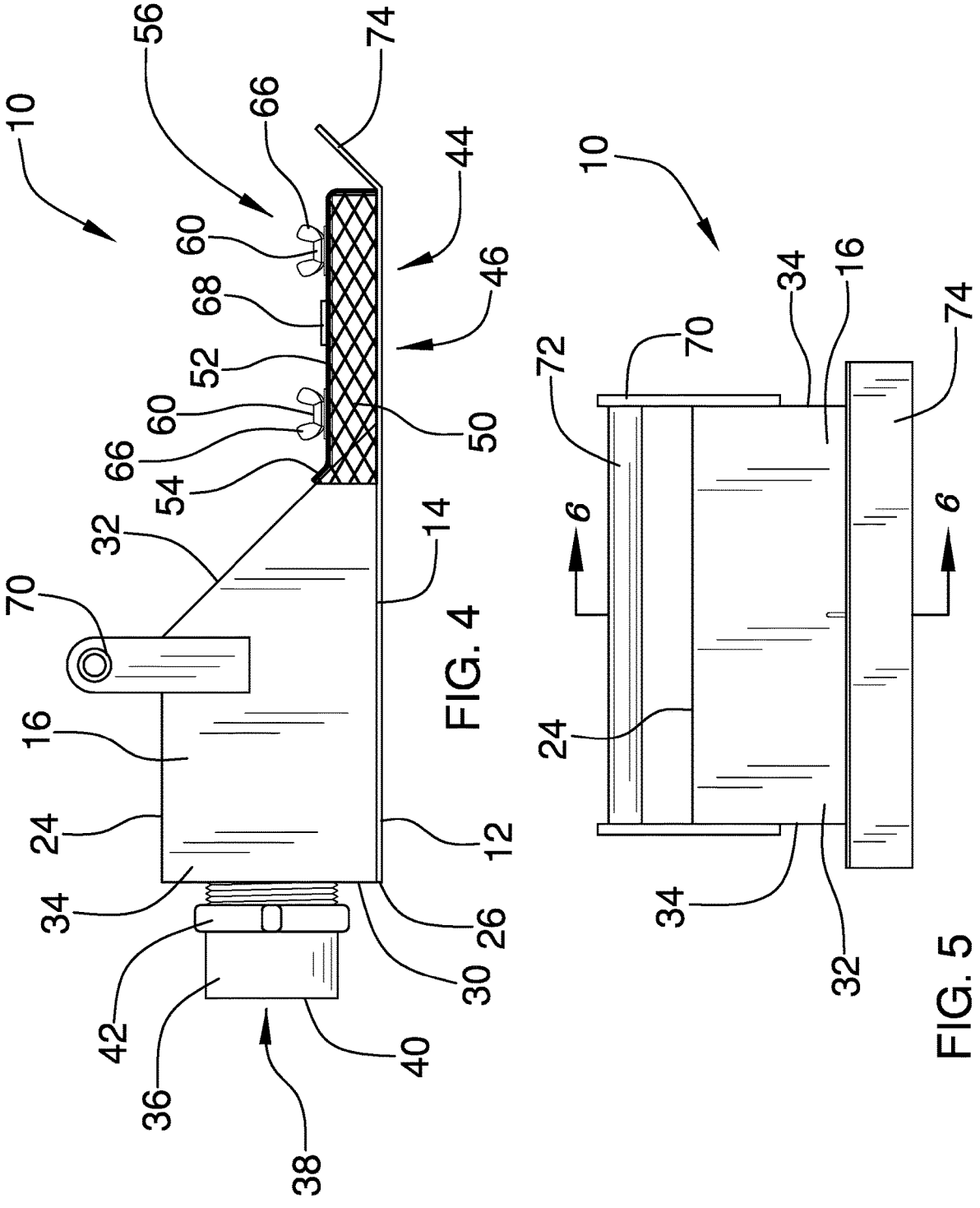
FIG. 4 is a side view of an embodiment of the disclosure.
FIG. 5 is a front view of an embodiment of the disclosure.
Figure 6:
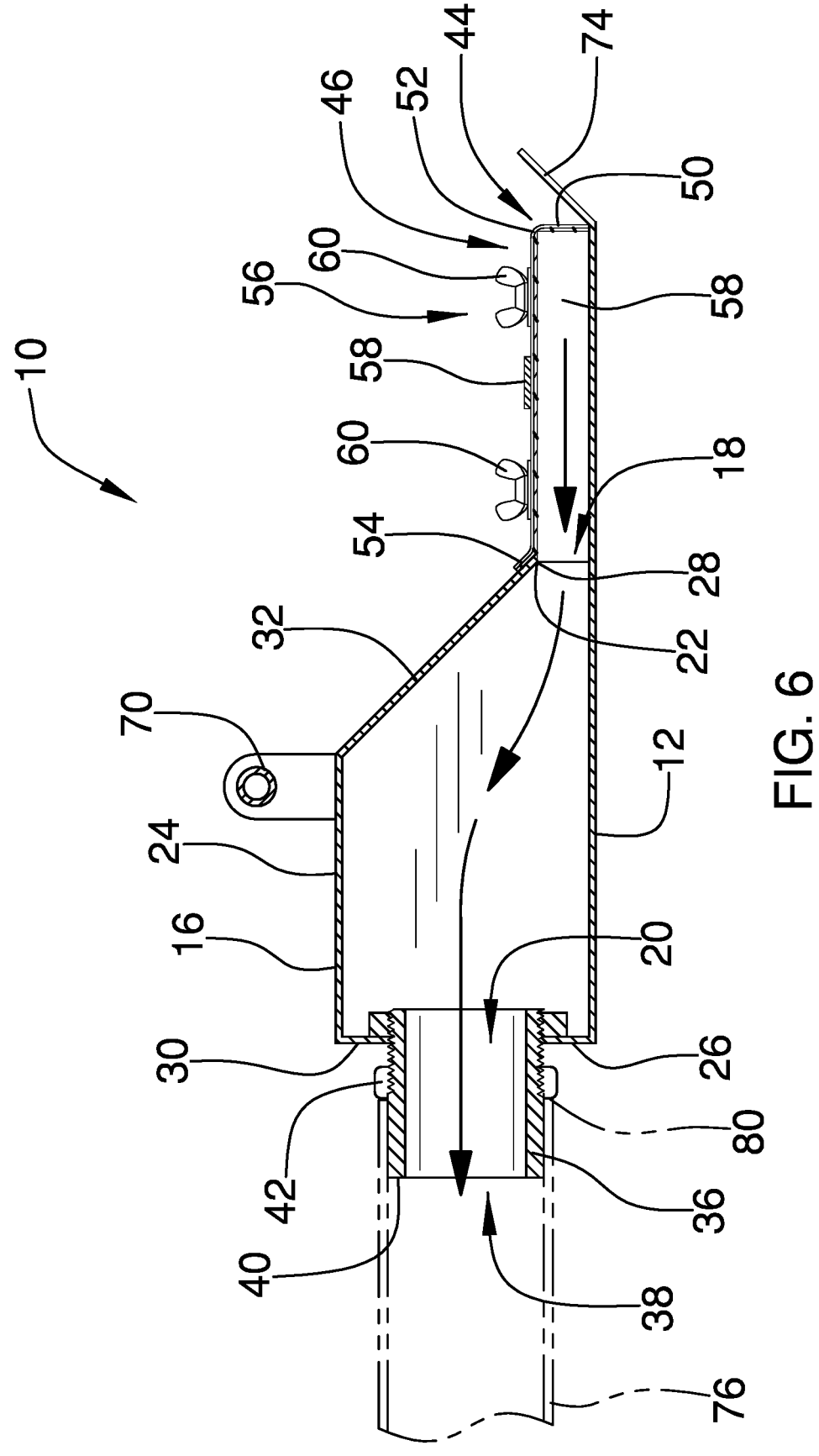
FIG. 6 is a cross-sectional view of an embodiment of the disclosure from the direction of arrows 6-6 in FIG. 5.
Figure 7:
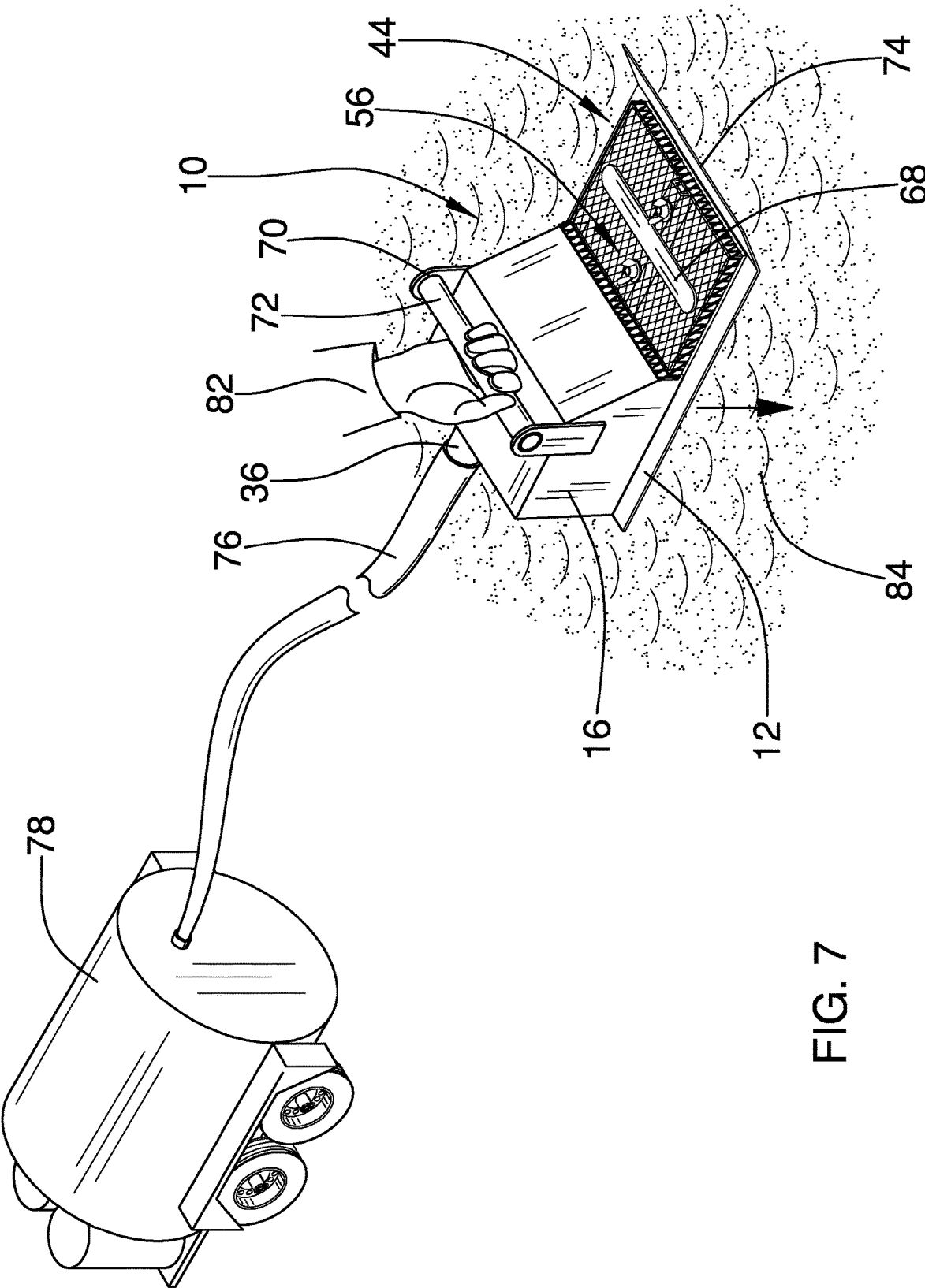
FIG. 7 is an in-use view of an embodiment of the disclosure.

With reference now to the drawings, and in particular to FIGS. 1 through 7 thereof, a new filtering apparatus embodying the principles and concepts of an embodiment of the disclosure and generally designated by the reference numeral 10 will be described.

As best illustrated in FIGS. 1 through 7, the filtering pan apparatus 10 generally comprises a base 12 which is planar and has a pair of free lateral edges 14. A duct 16 is coupled to and extends upwardly from the base 12. The duct 16 has an inlet opening 18 and an outlet opening 20 extending into the duct 16. The inlet opening 18 is positioned adjacent to the base 12, and a distance of a top edge 22 of the inlet opening 18 from the base 12 is less than a third of a distance of a top side 24 of the duct 16 from the base 12. The inlet opening 18 has a rectangular shape. The duct 16 is positioned adjacent to a rear end 26 of the base 12 with the inlet opening 18 being positioned on a front side 28 of the duct 16 and the outlet opening 20 being positioned on a rear side 30 of the duct 16. The duct 16 has a front wall 32 extending upwardly and rearwardly from the inlet opening 18 and a pair of lateral sides 34 which are each inset from one of the pair of free lateral edges 14 of the base 12.

A vacuum connector 36 is coupled to and extends away from the duct 16. The vacuum connector 36 is in fluid communication with the outlet opening 20 and has a connector opening 38 in a distal end 40 thereof relative to the duct 16 which extends into the vacuum connector 36. The vacuum connector 36 has an outer wall 42 extending from the duct 16 to the distal end 40 which is cylindrical and has a collar 44 that is coupled to and surrounds the outer wall 42.

A filtering screen 44 is coupled to and extends upwardly from the base 12, covering the inlet opening 18. The filtering screen 44 is liquid permeable and may comprise a mesh 46. In some embodiments, the filtering screen 44 is constructed of expanded metal. The filtering screen 44 extends forwardly from the duct 16 and has a top panel 48 and a peripheral panel 50. The peripheral panel 50 is coupled to a peripheral edge 52 of the top panel 48 and extends between the top panel 48 and the base 12. The peripheral panel 50 also extends from one of the pair of lateral sides 34 of the duct 16 around the top panel 48 to another of the pair of lateral sides 34. The filtering screen 44 has a flange 54 coupled to the top panel 48 which conforms to the front wall 32 of the duct 16.

A fastener assembly 56 releasably secures the filtering screen 44 to the base 12. In one embodiment, the fastener assembly 56 comprises an attachment member 58 and a pair of bolts 60. The attachment member 58 is coupled to a top surface 62 of the base 12 and has a pair of threaded holes 64 extending downwardly into the attachment member 58. Each of a pair of bolts 60 extends through the filtering screen 44 and is threadably coupled to an associated one of the pair of threaded holes 64 of the attachment member 58. The bolts 60 may comprise wing bolts 66 for easily attaching and detaching the filtering screen 44 to the base 12 by hand. In other embodiments, the fastener assembly 56 comprises a latch, a clamp, a tie, or the like.

A stiffener 68 is coupled to the top panel 48 of the filtering screen 44. The stiffener 68 is rigid and elongated, and the stiffener 68 extends laterally with respect to the filtering screen 44. A handle 70 is coupled to and extends upwardly from the duct 16. The handle 70 has an elongated grip 72 which is oriented laterally with respect to the duct 16. A lip 74 is coupled to a front end of the base 12. The lip 74 extends forwardly and upwardly away from the base 12.

In use, the vacuum connector 36 is inserted into a vacuum hose 76 of a vacuum system 78 such that the collar 44 abuts an end 80 of the vacuum hose 76. A user 82 grips the elongated grip 72 of the handle 70 to position the apparatus 10 on or near a surface such as a ground surface 84 to suck fluid from near the surface while filtering out solid objects. The filtering screen 44 is removable for cleaning, maintenance, replacement, or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A filtering pan apparatus for a wet vacuum system, the filtering pan apparatus comprising:
   a base;
   a duct being coupled to and extending upwardly from said base, said duct having an inlet opening and an outlet opening in fluid connection with said duct, said inlet opening being positioned adjacent to said base;
   a vacuum connector being coupled to and extending away from said duct, said vacuum connector being in fluid communication with said outlet opening, said vacuum connector having a connector opening in a distal end thereof relative to said duct, said connector opening extending into said vacuum connector; and
   a filtering screen being coupled to and extending upwardly from said base, said filtering screen covering said inlet opening, said filtering screen being liquid permeable, said filtering screen extending forwardly from said duct, said filtering screen having a top panel and a peripheral panel, said peripheral panel being coupled to a peripheral edge of said top panel, said peripheral panel extending between said top panel and said base, said peripheral panel extending from one of a pair of lateral sides of said duct around said top panel to another of said pair of lateral sides, said filtering screen having a flange coupled to said top panel which conforms to said front wall of said duct.

2. The apparatus of claim 1, further comprising said base being planar.

3. The apparatus of claim 1, further comprising said base having a pair of lateral edges.

4. The apparatus of claim 3, further comprising said duct having a pair of lateral sides, each said lateral side being inset from one of said pair of free lateral edges of said base.

5. The apparatus of claim 1, further comprising a distance of a top edge of said inlet opening from said base being less than a third of a distance of a top side of said duct from said base.

6. The apparatus of claim 1, further comprising said inlet opening having a rectangular shape.

7. The apparatus of claim 1, further comprising said duct being positioned adjacent to a rear end of said base, said inlet opening being positioned on a front side of said duct, said outlet opening being positioned on a rear side of said duct, said duct having a front wall extending upwardly and rearwardly from said inlet opening.

8. The apparatus of claim 1, further comprising said vacuum connector having an outer wall extending from said duct to said distal end, said outer wall being cylindrical, said vacuum connector having a collar being coupled to and surrounding said outer wall, said vacuum connector being configured for inserting into a vacuum hose such that said collar abuts an end of the vacuum hose.

9. The apparatus of claim 1, further comprising said filtering screen comprising a mesh.

10. The apparatus of claim 1, further comprising a stiffener being coupled to said top panel of said filtering screen, said stiffener being rigid.

11. The apparatus of claim 10, further comprising said stiffener being elongated and extending laterally with respect to said filtering screen.

12. The apparatus of claim 1, further comprising a handle being coupled to and extending upwardly from said duct.

13. The apparatus of claim 12, further comprising said handle having an elongated grip, said elongated grip being oriented laterally with respect to said duct.

14. The apparatus of claim 1, further comprising a lip being coupled to a front end of said base, said lip extending forwardly and upwardly away from said base.

15. The apparatus of claim 1, further comprising:
   said base being planar, said base having a pair of lateral edges;
   a distance of a top edge of said inlet opening from said base being less than a third of a distance of a top side of said duct from said base, said inlet opening having a rectangular shape, said duct being positioned adjacent to a rear end of said base, said inlet opening being positioned on a front side of said duct, said outlet opening being positioned on a rear side of said duct, said duct having a front wall extending upwardly and rearwardly from said inlet opening, said duct having a pair of lateral sides which are each inset from one of said pair of free lateral edges of said base;
   said vacuum connector having an outer wall extending from said duct to said distal end, said outer wall being cylindrical, said vacuum connector having a collar being coupled to and surrounding said outer wall, said vacuum connector being configured for inserting into a vacuum hose such that said collar abuts an end of the vacuum hose;
   said filtering screen comprising a mesh;
   a fastener assembly releasably securing said filtering screen to said base, said fastener assembly comprising:
      an attachment member being coupled to a top surface of said base, said attachment member having a pair of threaded holes extending downwardly into said attachment member; and
      a pair of bolts, each of said pair of bolts extending through said filtering screen and being threadably coupled to an associated one of said pair of threaded holes of said attachment member;
   a stiffener being coupled to said top panel of said filtering screen, said stiffener being rigid, said stiffener being elongated and extending laterally with respect to said filtering screen;

a handle being coupled to and extending upwardly from said duct, said handle having an elongated grip, said elongated grip being oriented laterally with respect to said duct; and a lip being coupled to a front end of said base, said lip extending forwardly and upwardly away from said base.

16. A filtering pan apparatus for a wet vacuum system, the filtering pan apparatus comprising:

a base;

a duct being coupled to and extending upwardly from said base, said duct having an inlet opening and an outlet opening in fluid connection with said duct, said inlet opening being positioned adjacent to said base;

a vacuum connector being coupled to and extending away from said duct, said vacuum connector being in fluid communication with said outlet opening, said vacuum connector having a connector opening in a distal end thereof relative to said duct, said connector opening extending into said vacuum connector;

a filtering screen being coupled to and extending upwardly from said base, said filtering screen covering said inlet opening, said filtering screen being liquid permeable, said filtering screen extending forwardly from said duct, said filtering screen having a top panel and a peripheral panel, said peripheral panel being coupled to a peripheral edge of said top panel, said peripheral panel extending between said top panel and said base, said peripheral panel extending from one of a pair of lateral sides of said duct around said top panel to another of said pair of lateral sides; and a fastener assembly releasably securing said filtering screen to said base, said fastener assembly comprising:

an attachment member being coupled to a top surface of said base, said attachment member having a pair of threaded holes extending downwardly into said attachment member; and a pair of bolts, each of said pair of bolts extending through said filtering screen and being threadably coupled to an associated one of said pair of threaded holes of said attachment member.

17. A wet vacuum system comprising:

a vacuum device capable of drawing a liquid therein via suction, said vacuum device having a vacuum hose; and a filtering pan apparatus comprising:

a base, said base being planar, said base having lateral edges;

a duct being coupled to and extending upwardly from said base, said duct having an inlet opening and an outlet opening in fluid connection with said duct, said inlet opening being positioned adjacent to said base, a distance of a top edge of said inlet opening from said base being less than a third of a distance of a top side of said duct from said base, said inlet opening having a rectangular shape, said duct being positioned adjacent to a rear end of said base, said inlet opening being positioned on a front side of said duct, said outlet opening being positioned on a rear side of said duct, said duct having a front wall extending upwardly and rearwardly from said inlet opening, said duct having a pair of lateral sides which are each inset from one of said pair of lateral edges of said base;

a vacuum connector being coupled to and extending away from said duct, said vacuum connector being in fluid communication with said outlet opening, said vacuum connector having a connector opening in a distal end thereof relative to said duct, said connector opening extending into said vacuum connector, said vacuum connector having an outer wall extending from said duct to said distal end, said outer wall being cylindrical, said vacuum connector having a collar being coupled to and surrounding said outer wall, said vacuum connector being inserted into a vacuum hose such that said collar abuts an end of the vacuum hose;

a filtering screen being coupled to and extending upwardly from said base, said filtering screen covering said inlet opening, said filtering screen being liquid permeable, said filtering screen comprising a mesh, said filtering screen extending forwardly from said duct, said filtering screen having a top panel and a peripheral panel, said peripheral panel being coupled to a peripheral edge of said top panel, said peripheral panel extending between said top panel and said base, said peripheral panel extending from one of said pair of lateral sides of said duct around said top panel to another of said pair of lateral sides, said filtering screen having a flange coupled to said top panel which conforms to said front wall of said duct;

a fastener assembly releasably securing said filtering screen to said base, said fastener assembly comprising:

an attachment member being coupled to a top surface of said base, said attachment member having a pair of threaded holes extending downwardly into said attachment member; and a pair of bolts, each of said pair of bolts extending through said filtering screen and being threadably coupled to an associated one of said pair of threaded holes of said attachment member;

a stiffener being coupled to said top panel of said filtering screen, said stiffener being rigid, said stiffener being elongated and extending laterally with respect to said filtering screen;

a handle being coupled to and extending upwardly from said duct, said handle having an elongated grip, said elongated grip being oriented laterally with respect to said duct; and a lip being coupled to a front end of said base, said lip extending forwardly and upwardly away from said base.

* * * * *